(12) United States Patent
Corsi

(10) Patent No.: US 11,680,678 B2
(45) Date of Patent: Jun. 20, 2023

(54) NON-INVASIVE ROOF MOUNTING ADAPTER PLATE AND METHOD FOR INSTALLING SAME

(71) Applicant: Peter A. Corsi, Clifton Park, NY (US)

(72) Inventor: Peter A. Corsi, Clifton Park, NY (US)

(*) Notice: Subject to any disclaimer, the term of this patent is extended or adjusted under 35 U.S.C. 154(b) by 475 days.

(21) Appl. No.: 16/700,655

(22) Filed: Dec. 2, 2019

(65) Prior Publication Data

US 2020/0173604 A1 Jun. 4, 2020

Related U.S. Application Data (60) Provisional application No. 62/774,399, filed on Dec. 3, 2018.

(51) Int. Cl.
| | | |
|---|---|---|
| *F16M 11/00* | (2006.01) | |
| *F16M 13/02* | (2006.01) | |
| *F16B 37/14* | (2006.01) | |
| *F16B 5/02* | (2006.01) | |

(52) U.S. Cl.
CPC ........... *F16M 13/02* (2013.01); *F16B 5/0275* (2013.01); *F16B 37/14* (2013.01)

(58) Field of Classification Search
CPC ....... F16M 13/02; F16B 5/0275; F16B 37/14; A62B 35/04; E04G 21/328
See application file for complete search history.

(56) References Cited

U.S. PATENT DOCUMENTS

| | | | |
|---|---|---|---|
| 2,002,006 A | | 5/1935 | Hall |
| 2,628,796 A | | 2/1953 | Krizman |
| 4,223,667 A | | 9/1980 | Paymal |
| 4,581,863 A | | 4/1986 | Thaler |
| 4,617,771 A | | 10/1986 | Tomaszewkki |
| 4,651,489 A | | 3/1987 | Hodges et al. |
| 4,989,826 A | | 2/1991 | Johnston, Jr. |
| 5,217,191 A | | 6/1993 | Smith |
| 5,328,212 A | | 7/1994 | Kosik, Jr. et al. |
| 5,603,187 A | | 2/1997 | Merrin et al. |
| 5,634,733 A | * | 6/1997 | Sperduti ............... E01F 9/638 52/165 |

(Continued)

FOREIGN PATENT DOCUMENTS

DE 102010016677 A1 11/2011
JP 2005002772 B2 1/2005

*Primary Examiner* — Amy J. Sterling
(74) *Attorney, Agent, or Firm* — Amster, Rothstein & Ebenstein LLP (57) ABSTRACT

A non-invasive roof mounting adapter plate and method for installing same. In one embodiment, a mounting adapter for attaching an object to a generally flat surface includes an anchor plate having an upper surface and a lower surface, and one or more first apertures extending through the upper and lower surfaces, each first aperture including a counter-bore configured to receive a corresponding first elongated fasteners, each elongated fastener having a length sufficient to extend through and securely fasten the anchor plate to a support structure below the generally flat surface; and a second fastener extending normal from the upper surface of the anchor plate and configured to secure the object to the mounting adapter, wherein load forces from the object are directly transferred from the anchor plate to a support structure below the generally flat surface via the first elongated fasteners.

16 Claims, 5 Drawing Sheets

(56) References Cited

U.S. PATENT DOCUMENTS

| | | |
|---|---|---|
| 5,816,554 A | 10/1998 | McCracken |
| 5,820,092 A | 10/1998 | Thaler |
| 5,993,675 A * | 11/1999 | Hagerthy ............ B01D 17/0202 |
| | | 210/450 |
| 6,012,889 A * | 1/2000 | Robbins ................ F16B 41/007 |
| | | 411/908 |
| 6,256,701 B1 | 7/2001 | Goto |
| 6,324,800 B1 | 12/2001 | Valentz et al. |
| 6,360,491 B1 | 3/2002 | Ullman |
| 6,526,701 B2 | 3/2003 | Stearns et al. |
| 6,592,093 B2 | 7/2003 | Valentz |
| 6,663,070 B2 | 12/2003 | Valentz et al. |
| 6,669,163 B2 | 12/2003 | Davis, Jr. |
| 6,863,253 B2 | 3/2005 | Valentz et al. |
| 7,168,138 B2 | 1/2007 | Lubera et al. |
| 7,213,304 B2 | 5/2007 | Lubera et al. |
| 7,475,513 B2 | 1/2009 | Parker |
| 7,661,240 B2 | 2/2010 | Sargent |
| 7,686,268 B2 | 3/2010 | Terunuma et al. |
| 7,730,901 B2 | 6/2010 | Ball |
| 7,762,027 B1 | 7/2010 | Wentworth et al. |
| 7,895,808 B1 | 3/2011 | Wentworth et al. |
| 7,905,064 B1 | 3/2011 | Wentworth et al. |
| 7,921,607 B2 | 4/2011 | Thompson et al. |
| 8,122,648 B1 | 2/2012 | Liu |
| 8,448,405 B2 | 5/2013 | Schaefer et al. |
| 8,479,455 B2 | 7/2013 | Schaefer et al. |
| 8,511,628 B2 * | 8/2013 | Cox ........................ A62B 1/04 |
| | | 248/688 |
| 8,733,718 B2 | 5/2014 | Corsi |
| 9,279,442 B2 * | 3/2016 | Naylor .................... F16B 37/14 |
| 9,510,880 B2 * | 12/2016 | Terrill ................ A61B 17/8605 |
| 10,213,632 B2 * | 2/2019 | Gooder .................. A62B 35/04 |
| 10,962,043 B2 * | 3/2021 | Stevens .................... F16B 35/06 |
| 2004/0031902 A1 | 2/2004 | Davis, Jr. |
| 2004/0240962 A1 * | 12/2004 | Teng ...................... F16B 5/0208 |
| | | 411/353 |
| 2004/0256176 A1 * | 12/2004 | Argoud .................. E04G 21/329 |
| | | 182/45 |
| 2009/0190996 A1 * | 7/2009 | Clarke .................... F16B 2/065 |
| | | 403/231 |
| 2010/0006170 A1 * | 1/2010 | Pyron ...................... H02G 3/14 |
| | | 138/89 |
| 2011/0247279 A1 | 10/2011 | Stearns et al. |
| 2011/0247295 A1 | 10/2011 | Stearns et al. |
| 2012/0023835 A1 | 2/2012 | Stearns et al. |
| 2012/0023836 A1 | 2/2012 | Stearns et al. |
| 2012/0023843 A1 | 2/2012 | Stearns et al. |
| 2012/0031019 A1 | 2/2012 | Stearns et al. |
| 2012/0144760 A1 | 6/2012 | Schaefer et al. |
| 2013/0074441 A1 | 3/2013 | Stearns |
| 2013/0319990 A1 * | 12/2013 | Casey ................... E04D 13/103 |
| | | 219/213 |
| 2016/0199678 A1 * | 7/2016 | Tsai ....................... C08G 18/10 |
| | | 248/636 |
| 2017/0247894 A1 * | 8/2017 | Sargent ................... A62B 35/04 |
| 2019/0208931 A1 * | 7/2019 | Carmona ................ F16B 37/14 |
| 2019/0234086 A1 * | 8/2019 | Allen .................... E04G 21/328 |
| 2019/0240515 A1 * | 8/2019 | Saygivar ............... F16M 11/046 |
| 2021/0040979 A1 * | 2/2021 | Pegurier ................ F16B 37/14 |
| 2021/0187775 A1 * | 6/2021 | Brown ................. B26D 7/2614 |

* cited by examiner

NON-INVASIVE ROOF MOUNTING ADAPTER PLATE AND METHOD FOR INSTALLING SAME

CROSS-REFERENCE TO RELATED APPLICATION

This patent application claims the benefit of U.S. Provisional Application No. 62/774,399, filed Dec. 3, 2018, the content of which is incorporated by reference herein in its entirety.

FIELD OF THE INVENTION

The present invention relates to support apparatus, and more specifically to mounting adapters for supporting equipment and hardware devices typically found on a roof top of a building or in direct contact with the ground, and installing the same.

BACKGROUND OF THE INVENTION

Commercial and residential buildings often have flat top roofs and/or slightly sloped roof tops, as opposed to high-pitched roofs that are typically observed on many types of residential houses (e.g., colonial, cape, ranch, Tudor and other styles of houses). The flat top roofs on such buildings or other edifices avail themselves for installing various types of equipment that are used by the owners and/or tenants of the buildings. Such "equipment" can include air conditioning units, heat exchangers, water towers, protective railings, piping, photovoltaic (solar) panels, communications antennae, among other equipment and hardware devices typically installed on roof surfaces, and especially flat top roofs.

Securing the equipment is typically implemented by providing a frame or chassis to support the equipment on the roof. The frame or chassis is preferably provided by the equipment manufacturer or can be custom configured in accordance to local building codes and standards to support the equipment. Anchor devices are then used as interfaces for securing the frame or chassis to the decking of the roof. For example, a frame or chassis having four support legs would first require four anchor devices to be installed at a selected location on the flat top roof corresponding to each support leg. Thereafter, the frame/chassis is positioned over the four anchor devices to enable the installer to properly attach the four support legs to a corresponding anchor device.

Figure 1:
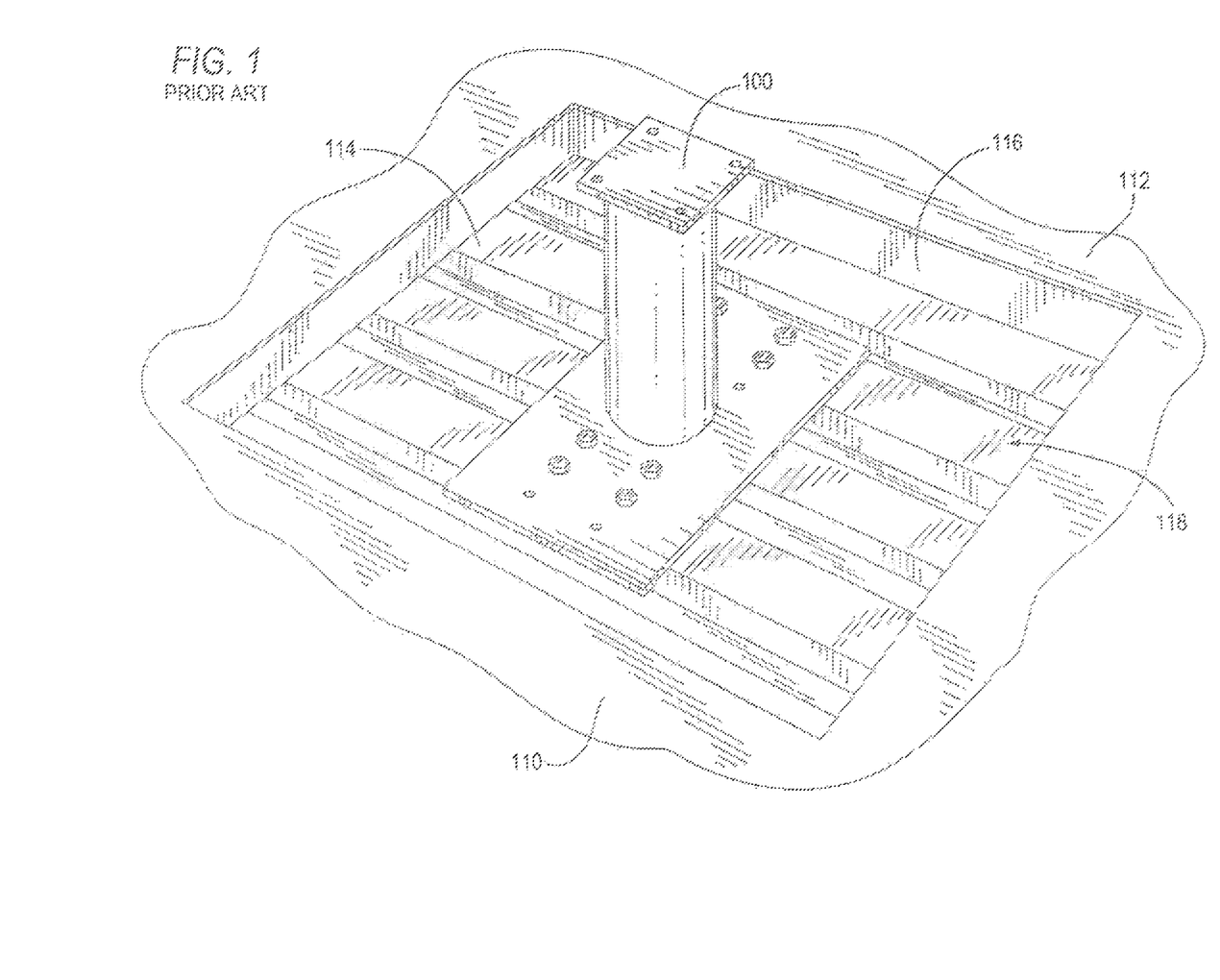
FIG. 1 is a top perspective view of a prior art roof mounting adapter being installed on a roof of a structure by removing portions of the roof membrane and underlying insulation to expose the roof decking therebelow.

Referring to the FIG. 1, a perspective view of a prior art anchor device 100 is illustratively shown being installed on a roof deck 110. Installing the anchor devices that are presently available in the commercial market requires the equipment technician and/or roofer to penetrate the roof surface including, for example, the roof covering 112 or membrane and insulation 116 therebelow, and attach the anchor device 100 directly to a roof structural member 114, such as a rafter or structural decking. More specifically, when retrofitting anchor devices into an existing membrane or covering 112 on a roof 110, a significant hurdle is that the anchoring devices 100 must be secured directly to the structural decking 114 or structural members below the roof covering 112 to provide ample support for the equipment. This is especially true for anchor devices 100 which need to withstand lateral loads. Mounting these types of anchor devices 100 typically requires cutting through the roof membrane 112 and creating an opening 118 in the insulation 116 to expose the building's structural deck 114 or other structural components hidden beneath the roof.

This type of invasive operation compromises the integrity of the roof covering and necessitates some type of roof repair or patching work, which often creates "difficult to flash" penetrations. Additionally, flashing of the prior art anchor devices 100 frequently cannot be accomplished with roof manufacturer's approved procedures. Therefore, there is a need for a non-invasive roof mounting adaptor that does not require removal of the roof surface layers and insulation to expose the underlying roof decking and/or support structures.

SUMMARY OF THE INVENTION

The disadvantages heretofore associated with the prior art are overcome by the present invention of a non-invasive roof mounting adapter plate and method for installing same. In one embodiment, a mounting adapter for attaching an object to a generally flat surface comprises an anchor plate having an upper surface and a lower surface, and one or more first apertures extending through the upper and lower surfaces, each first aperture including a counter-bore configured to receive a corresponding first elongated fastener, each elongated fastener having a length sufficient to extend through and securely fasten the anchor plate to a support structure below the generally flat surface; and a second fastener extending normal from the upper surface of the anchor plate and configured to secure the object to the mounting adapter, wherein load forces from the object are directly transferred from the anchor plate to a support structure below the generally flat surface via the first elongated fasteners.

In one aspect, the load forces from the object include a compressive load force. In another aspect, the load forces from the object include a tensile load force. In still another aspect, the load forces from the object include a shearing load force.

In one aspect, the counter-bore formed in the anchor plate includes a threaded upper portion. In another aspect, the counter-bore formed in the anchor plate includes a non-threaded lower portion. In yet another aspect, each of first elongated fasteners includes a shaft having a threaded upper portion and a separately threaded lower portion, the threaded upper portion of the first elongated fastener conforming to the threaded upper portion of the corresponding counter-bore, and the threaded lower portion of each first elongated fastener configured to extend through a non-threaded lower portion of the corresponding counter-bore and engage the support structure below the generally flat surface.

In yet another aspect, each of the first elongated fasteners comprises a screw and a threaded locking member, the screw having a head configured to be supported on a lower surface of the threaded upper portion of the corresponding counter-bore and a shaft having a threaded lower portion configured to extend through a non-threaded lower portion of the counter-bore and engage the support structure below the generally flat surface.

In one aspect, the threaded locking member is a cap.

In another aspect, the upper surface of the anchor plate includes one or more first shoulders configured to receive an upper portion of one of the first elongated fasteners. In yet another aspect, the one or more first shoulders form a threaded upper portion of the corresponding one or more counter-bores. In a further aspect, the one or more first shoulders are configured to receive a corresponding cap for applying a locking force on a corresponding one of the first elongated fasteners. In another aspect, an exterior surface of the one or more shoulders and an interior sidewall of the corresponding cap are threaded for engagement with each other.

In one aspect, the second fastener extends from a second shoulder formed on the upper surface of the anchor plate. In another aspect, the second fastener is attached to a second shoulder formed on the upper surface of the anchor plate.

In another embodiment, a method for attaching an object to a mounting surface with a mounting adapter, in which the mounting adapter comprises an anchor plate having an upper surface and a lower surface, and one or more first apertures extending through the upper and lower surfaces, each first aperture including a counter-bore configured to receive a corresponding first elongated fasteners, each elongated fastener having a length sufficient to extend through and securely fasten the anchor plate to a support structure below the generally flat surface; and a second fastener extending normal from the upper surface of the anchor plate and configured to secure the object to the mounting adapter, and the method comprises the steps of: positioning the anchor plate on the mounting surface at a predetermined location; inserting a first elongated fastener through a corresponding one of the first apertures; securing each elongated fastener to a predetermined support structure positioned beneath the anchor plate for attaching the mounting adapter to the mounting surface; securing the second fastener to the object, wherein load forces from the object are directly transferred from the mounting adapter to a support structure below the generally flat surface via the first elongated fasteners.

BRIEF DESCRIPTION OF THE DRAWINGS

The invention will be further described below and with reference to the attached drawings in which.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION OF THE PREFERRED EMBODIMENT

Referring now to FIGS. 2-7, there is shown preferred embodiments of a roof mount adapter 200 and fasteners suitable for use to anchor and otherwise secure equipment and hardware devices to a roof 100 of a building or other edifice or structure (not shown). The roof mount adapter 200 of the present invention is suitable for installation on many different types of roof structures, and is particularly suitable for commercial flat membrane type roofs. Examples of well-known flat or low-sloped membrane roofs include an insulated, multi-ply build-up roof; a single or multi-ply modified Bitumen roof; an insulated single ply, mechanically attached roof; and an insulated, single-ply fully adhered roof. Common to these types of flat style roofs is a lowermost support structure formed by, for example, an 18-22 gauge steel deck 114 of the type illustratively shown in FIG. 1, which is covered by one or more layers of insulation/insulation board 116, and a top cover layer 112 formed by cap sheets or a roofing membrane.

Advantageously, the roof mounting adapter of the present invention manages and distributes downward, (i.e., "compression"), upward (i.e., "up-lift"), and lateral (i.e., "shearing") loads, while free-floating above the structural roof deck 114 so as not to damage or otherwise crush the underlying insulation 116 or the roof membrane 112. In one embodiment, the load management and distribution is provided by a novel structure which is configured to capture or otherwise secure the head and/or upper shaft portion of roofing screws, which are used to fasten the roof mounting adapter to the roof deck, to the roof mounting adapter itself.

For sake of better understanding the invention and use of consistent terms, the roof mount adapter is described herein as attaching to a roof structure of an edifice or building, supporting and securing various types of equipment and hardware structures to the roof of the edifice or building, and being generally circular in shape. However, a person of ordinary skill in the art will appreciate that the roof mount adapter is not limited to being mounted to just roof structures, but can be installed on any flat surface (e.g., flooring, a sidewall, etc.) in which one or more fasteners can be utilized to attach or otherwise mount the roof mount adapter to the flat surface. Furthermore, a person of ordinary skill in the art will appreciate that the roof mount adapter 200 can be configured to interface with various types of brackets, hardware devices and/or fasteners for securing the equipment and structures (e.g., air conditioning units, solar panels, cellular antennas, rails, piping, among other structures and frames) to the roof surface. Moreover, a person of ordinary skill in the art will appreciate that the illustrative circular shape of the roof mount adapter is not limiting, and can be configured in other well-known shapes, such as rectangular, oval, triangular, or any other shape including customized shapes for purposes of securing the equipment to the surface of the roof 110.

Moreover, although the roof mount adapter is illustratively described as being substantially planar, a person of ordinary skill in the art will appreciate that the roof mount adapter can alternatively be customized, for example, to include angled surfaces or portions to enable mounting of the adapter to corresponding angled portions of the roof surface. For example, the roof mount adapter can be configured as a generally L-shaped adaptor to attach to a corresponding portion of a roof where substantially vertical and horizontal roof structures intersect to form a right angle or corner section of the roof. Accordingly, the roof mount adapter can be configured to correspond to and mount at or proximate the vertex or vertices where two or more planes formed by roof surfaces intersections.

Figure 2:
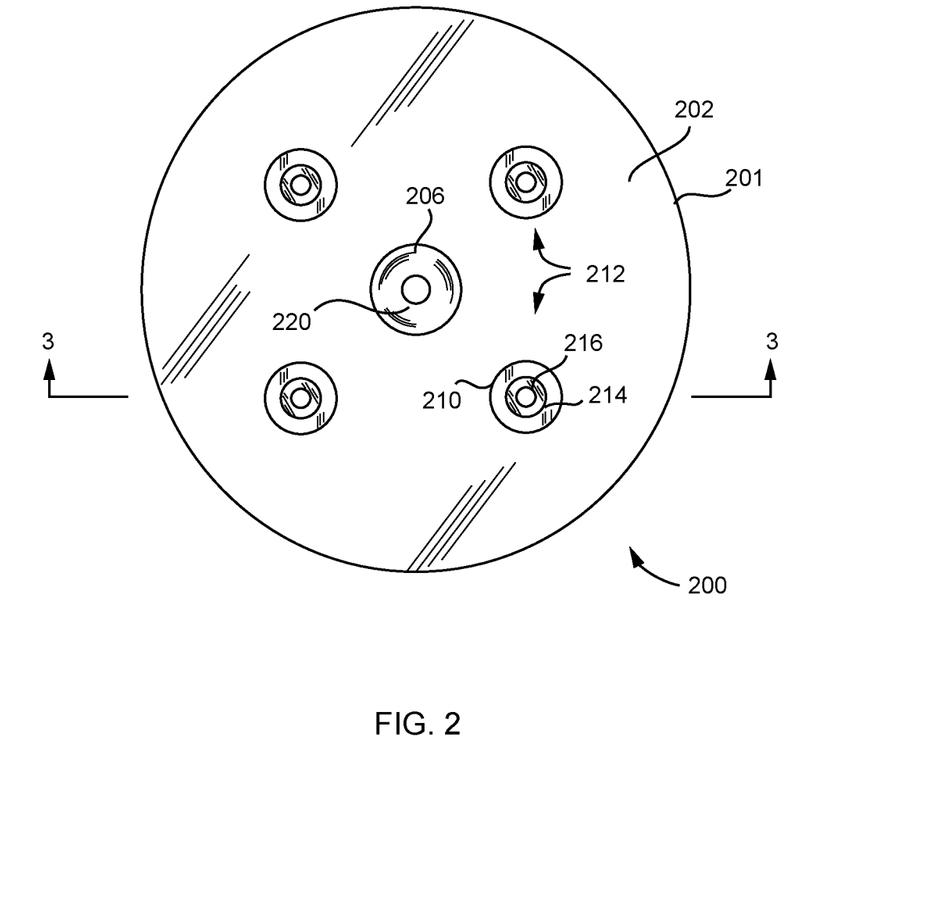
FIG. 2 is a top plan view of a roof mount adapter of the present invention.
Figures 3, 4:
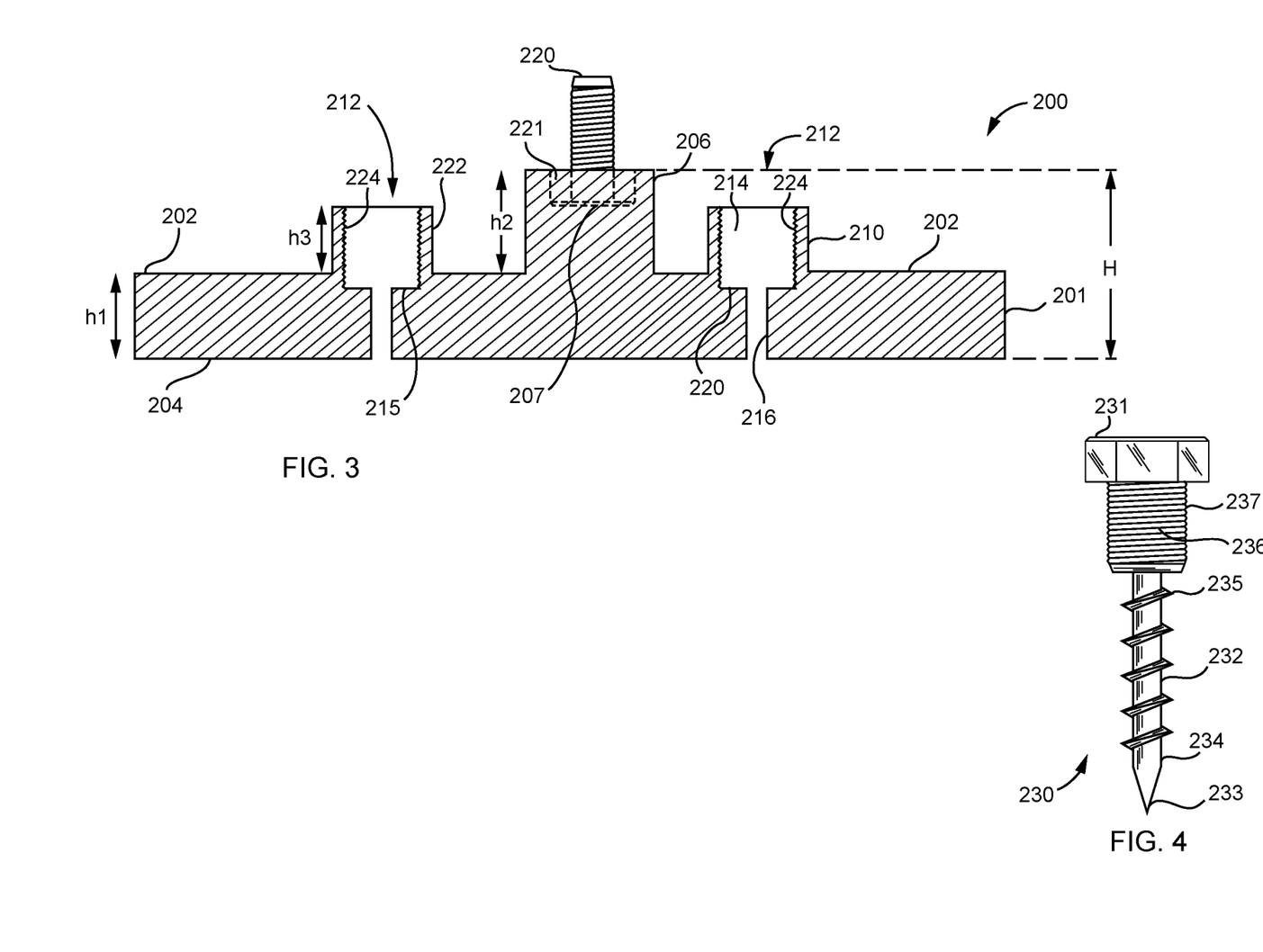
FIG. 3 is a cross-sectional view of the roof mount adapter taken long line 3-3 of FIG. 2.
FIG. 4 is a side elevation view of a first fastener suitable for use with the roof mount adapter of FIG. 2.

Referring now to FIGS. 2 and 3, the roof mount adapter 200 includes an anchor plate 201, one or more fasteners 230 for securing the anchor plate 201 to a roofing structure 110 (FIG. 1), and one or more fasteners 220 for securing an object, bracket or equipment (not shown) to the anchor plate 201. The anchor plate 201 is generally planar having an upper surface 202 and a substantially flat lower surface 204 that is suitable for mounting over and interfacing with the roof covering 112 of a roof structure 110. The anchor plate 201 is preferably fabricated from machined, high-strength aluminum or stainless steel, although other durable and weather resistant materials and/or composite material(s) can be utilized.

In one embodiment and as discussed in further detail below with respect to FIGS. 4-7, one or more fasteners 230, 241 (e.g., self-tapping roof screws) secure the anchor plate 201 to the roof structure 100. Preferably, the heads of the fasteners are captured and locked between the upper surface of the anchor plate 202 and the lower surface of a locking cap 250 (FIGS. 5 and 7) to transfer downward forces, upward forces and lateral forces from the fastened object or equipment to the roof deck 114 without crushing or otherwise compromising the roof insulation 116 and roof membrane 114. Alternatively, a multi-threaded, self-tapping screw 230 (FIG. 4) secures the object or equipment to the roof deck 114 without crushing or otherwise compromising the roof insulation 116 and roof membrane 114.

Referring to FIGS. 2 and 3, the anchor plate 201 includes one or more first apertures 212 for receiving the roof deck fasteners 230. The one or more first apertures 212 extend through the upper surface 202 and lower surface 204 of the plate 201. In one embodiment, the one or more first apertures 212 are formed as a counter-bore in which an upper bore portion 214 that is positioned proximate the upper surface 202 has a diameter that is greater than its axially-aligned lower bore portion 216, which extends through the lower surface 204 of the plate 201. In the embodiment shown in FIGS. 2 and 3, four first apertures 212 are illustratively shown, but such quantity is not considered limiting. In one embodiment, each first aperture 212 includes its upper bore portion 214 formed within a raised annular shoulder 210, which extends upwardly from, (i.e., normal or substantially normal to) the upper surface 202 of the anchor plate 201. The shoulders 210 provide additional supporting structure for the fasteners 230 in instances where the anchor plate 201 is thin, i.e., has a low height "h1" relative to the height of the fastener 230. Alternatively, the anchor plate 201 can have an overall height "H" that is sufficient to enable the formation of the entire counter-bore without the addition of the shoulders 210. A person of ordinary skill in the art will appreciate that the illustrative quantity, positioning, spacing and angling of the first apertures 212 shown in the drawings is not considered limiting.

The lower bore portion 216 of each of the one or more first fasteners 212 is an unthreaded aperture dimensioned for receiving a roof deck fastener 230, such as a self-drilling No. 14 or No. 15 sized roof screw. The larger diameter upper portion 214 of the counter-bore includes interior threads 224 for receiving a corresponding threaded fastener (e.g., threaded bolt 230 of FIG. 4) for securing the anchor plate 201 to the roof structure 110.

Referring again to FIGS. 2 and 3, a central shoulder 206 illustratively extends upwardly from the center of the upper surface 202 of the anchor plate 201. The fastener 220, such as a threaded bolt, extends upwardly from the shoulder 206 for purposes of enabling a roofer or technician to secure a bracket, equipment or other object (not shown) thereto after the anchor plate 201 is secured to the roof deck 110. Although a single central fastener 220 and central shoulder 206 is illustratively shown in the drawings, a person of ordinary skill in the art will appreciate that the quantity, positioning, spacing and angling of the shoulder 206 and corresponding fastener 220 are not considered limiting. The height (h2) of the shoulder 206 is preferably greater than the height (h3) of the deck screw shoulder 210 (h2>h3) to avoid interference by the shoulders 210 when securing the object/equipment to the anchor plate 201. Although the shoulder 206 is depicted as being circular, such shape and diameter or dimensions is not considered limiting. Moreover, although a single fastener 220 is depicted as extending upwardly from the shoulder 206, a person of ordinary skill in the art will appreciate that multiple fasteners can be implemented from a single or plurality of shoulders 206 to facilitate securement of an object/equipment to the anchor plate 201.

The shoulder 206 can include an aperture and cavity 207 (drawn in phantom in FIG. 3) for receiving the head 221 of the fastener 220, for instance, where the fastener is a bolt. In one embodiment, the cavity 207 can have a hexagon or other well-known shape to conform to the head 221 of the bolt to prevent the threaded shaft of the upwardly extending bolt from turning when a bracket or an object/equipment (not shown) is attached and secured with a corresponding nut thereto. In one embodiment, the cavity 207 is formed by the head 221 of the bolt 220 during the casting process of the anchor plate 201. In another embodiment, the fastener 220 is a threaded rod that is welded to the top of the shoulder 206. The type and technique of attachment of the fastener 220 to the anchor plate 201 is not considered limiting.

Referring to FIG. 4, in one embodiment, a single fastener 230 includes a head 231 and a multi-sized and threaded shaft 232 in which a lower shaft portion 234 includes a self-tapping tip 233 and a first sized thread 235 (e.g., No. 14 or No. 15), and an upper shaft portion 236 having a second sized diameter and thread size 237, which can be the same or different than the first thread size 235 at the lower portion 234 of the shaft 232.

Figure 7:
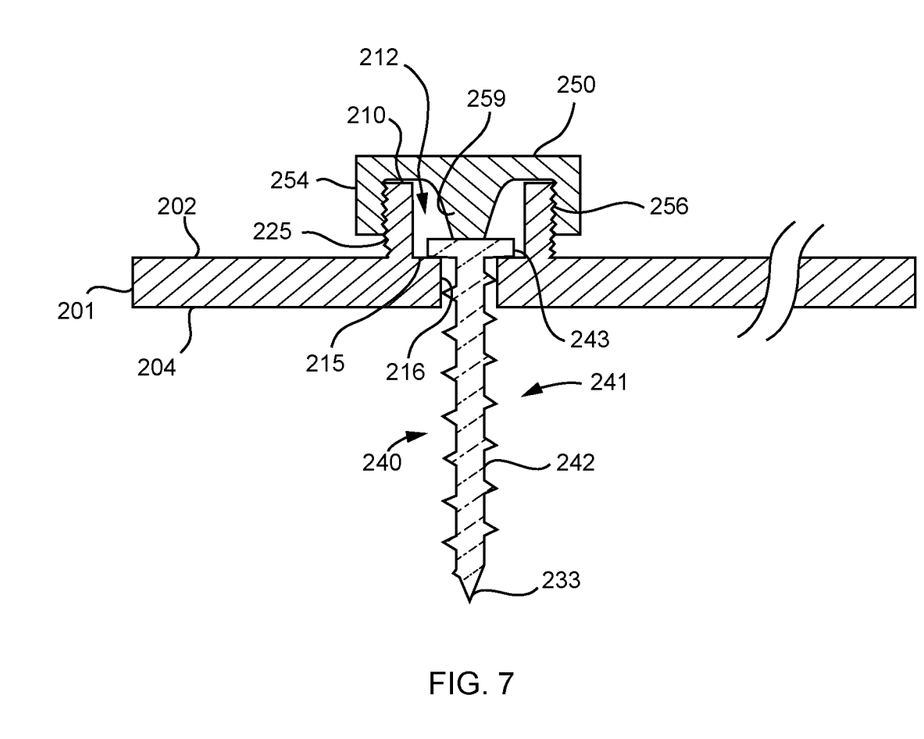
FIG. 7 is a cross-sectional view of a second fastener and the retaining cap suitable for use with the roof mount adapter of FIG. 2.

Referring now to FIG. 7, another embodiment of a fastener arrangement 240 is shown in which a well-known fastener without the upper shaft portion 236 is inserted into the each counter-bore shaped first aperture 212. That is, the single fastener 230 illustratively shown in FIG. 4 without the upper shaft portion 236 is replaced by two separate fastener components, e.g., an upper fastener 250 such as a threaded cap and a lower fastener 241 such as a screw. Illustratively, a fastener 241 such as a deck screw extends through the lower portion 216 of each counter-bore 212 for securely fastening the anchor plate 201 to the roofing structure therebelow. The lower fastener 241 includes a threaded shaft 242 with a self-tapping tip 233 (e.g., No. 14 or No. 15 decking screw) that can be tightened (screwed) down until the lower surface of the screw head 243 is seated on a ledge or seat 215 of the counter-bore 212, and thereby secures the anchor plate 201 to the roof deck 110.

Figures 5, 6:
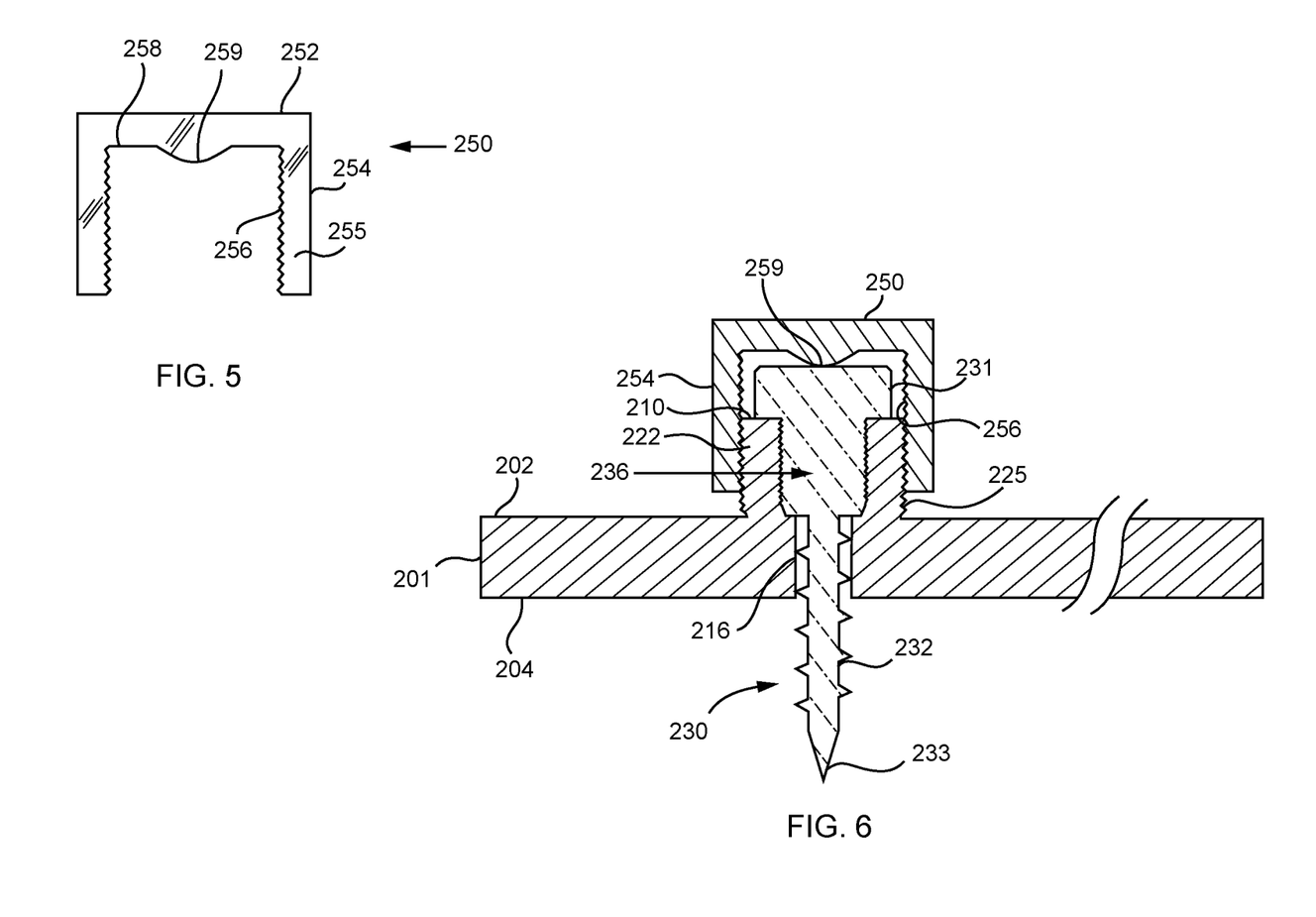
FIG. 5 is a side elevation view of a cap suitable for use with the roof mount adapter of FIG. 2.
FIG. 6 is a partial cross-sectional view of the roof mount adapter illustrating the cap of FIG. 5 disposed over a fastener shoulder which facilitates the first fastener extending through the roof mount adapter of FIG. 2.

Referring to FIGS. 5 and 6, an optional cap 250 can similarly be tightened over the fastener 230 to provide additional locking protection and seal the counter-bore 212 and the lower fastener 230 from the surrounding environment (e.g., water, dirt, debris and the like). The cap 250 includes a top 252 and a sidewall 254 which is threaded 256 on its interior wall 255, as shown in FIG. 5. The shoulder 210 has an exterior wall 222 which is threaded 225. The threads 256 on the interior wall 255 of the cap 250 conform to the exterior threads 225 of the shoulder 210. The cap 250 can further include a bulbous or downwardly extending portion 259 projecting downwardly from the interior of the top 252. The bulbous portion 259 is configured to engage and apply a downward force when tightened over the head 231 of the fastener 230, as illustratively shown in FIG. 6.

Similarly, the bulbous portion 259 is configured to engage and apply a downward force when tightened over the head 243 of the fastener 241, as illustratively shown in FIG. 7.

More specifically and referring to FIG. 7, the threaded locking member illustratively in the form of a threaded cap 250 is tightened down over the lower screw fastener 241 such that an interior portion 259 (e.g., a bulbous/downward extending portion) contacts and locks the head 243 against the ledge 215 of the counter-bore 212 to prevent undesirable loosening of the fastener 241 and anchor plate 201, as well as isolate the counter-bore 212 and screw head 243 from the surrounding environment.

Referring to FIGS. 3, 6 and 7, the loads (e.g., downward, upward and lateral loads) from the equipment are transferred directly to the support decking 114 (FIG. 1) positioned below the roof surface 112 via the fasteners 230, 241 and corresponding shanks of the roof screws 230. In particular, referring to FIGS. 3 and 4, the downward loads pass through the shoulder 206 and are also applied to the internal threads 224 of the fastener shoulder(s) 210, which transfer the load forces to the upper and lower portions 236, 234 of the fastener 230 of FIG. 4 and directly to the roofing structure 114 therebelow. Alternatively, referring to FIG. 7 the downward loads from the equipment pass through the shoulder 206 and are also applied to the internal threads 224 of the fastener shoulder(s) 210, which transfer the load forces to the threads 256 of the cap 250. In either embodiment where the cap 250 is used, the bulbous portion 259 of the cap 250 further applies a downward force to the head 231, 243 of the fastener 230, 241 of FIGS. 5 and 7, which in turn transfers the load forces through the lower threaded shaft 242 directly to the roofing structure 114 therebelow. In any of the embodiments (with or without the cap 250), the transfer of the load forces from the equipment to the underlying roof membrane 112 and insulation 116 are avoided. Rather, the loads from the equipment are directed through the elongated roofing screws 230, 241 and transferred directly to the underlying roof decking 114.

Accordingly, each screw 230, 241 will transfer a proportion of the total sum of the downward, upward and lateral forces to the underlying roof decking 114. The anchor fasteners (i.e., roofing screws) 230, 241 which will be selected for use are in accordance with the screw manufacturer's specifications and ratings to withstand the maximum combined downward, upward and lateral loads that may be experienced on the roof 110. In this manner, the elongated roof screws 230, 240 will maintain the roof mount anchor 201 in its selected position on the roof surface 112 and at a predetermined height above the roof decking 114 to prevent damaging and/or crushing of the insulation 116 therebetween when exposed to the combined (or net) downward, upward and lateral forces.

As described above, the roof mount adapter of the present invention enables a roofer or equipment installation technician to install or otherwise mount equipment on a generally flat roof surface. Moreover, the roofer/technician does not have to cut away the roofing membrane and insulation to expose the underlying roof decking 114 to subsequently mount the equipment mounting adapter as required in the prior art. Advantageously, the roof mount adapter of the present invention eliminates the need to expose the underlying roof decking and further having to patch the damaged roof during the installation process to prevent water leakage.

As will be apparent to one of ordinary skill in the art from the above description, other embodiments can be derived by obvious modifications and variations of the apparatus and methods disclosed. The scope of the invention is therefore to be determined by the claims that follow.

I claim:

1. A mounting adapter for attaching an object to a generally flat surface comprising:
    an anchor plate having an upper surface and a lower surface, and one or more first apertures extending through the upper and lower surfaces, each first aperture including a counter-bore configured to receive a corresponding first elongated fastener, each elongated fastener having a length sufficient to extend through and securely fasten the anchor plate to a support structure below the generally flat surface; and
    a second fastener extending from the upper surface of the anchor plate in an upwardly direction generally opposing a fastening direction of the first elongated fasteners, said second fastener having a first end attached to the anchor plate and a second end configured to secure the object to the mounting adapter over the general flat surface, wherein the anchor plate is configured to transfer load forces from the object to a support structure below the generally flat surface via the first elongated fasteners.

2. The mounting adapter of claim 1, wherein the load forces from the object include a compressive load force.

3. The mounting adapter of claim 1, wherein the load forces from the object include a tensile load force.

4. The mounting adapter of claim 1, wherein the load forces from the object include a shearing load force.

5. The mounting adapter of claim 1, wherein the counter-bore formed in the anchor plate includes a threaded upper portion.

6. The mounting adapter of claim 1, wherein the counter-bore formed in the anchor plate includes a non-threaded lower portion.

7. The mounting adapter of claim 5, wherein each of first elongated fasteners includes a shaft having a threaded upper portion and a separately threaded lower portion, the threaded upper portion of the first elongated fastener conforming to the threaded upper portion of the corresponding counter-bore, and the threaded lower portion of each first elongated fastener configured to extend through a non-threaded lower portion of the corresponding counter-bore and engage the support structure below the generally flat surface.

8. The mounting adapter of claim 5, wherein each of the first elongated fasteners comprises a screw and a threaded locking member, the screw having a head configured to be supported on a lower surface of the threaded upper portion of the corresponding counter-bore and a shaft having a threaded lower portion configured to extend through a non-threaded lower portion of the counter-bore and engage the support structure below the generally flat surface.

9. The mounting adapter of claim 8, wherein the threaded locking member is a cap.

10. The mounting adapter of claim 1, wherein the upper surface of the anchor plate includes one or more first shoulders configured to receive an upper portion of one of the first elongated fasteners.

11. The mounting adapter of claim 10, wherein the one or more first shoulders form a threaded upper portion of the corresponding one or more counter-bores.

12. The mounting adapter of claim 11, wherein the one or more first shoulders are configured to receive a corresponding cap for applying a locking force on a corresponding one of the first elongated fasteners.

13. The mounting adapter of claim 12, wherein an exterior surface of the one or more shoulders and an interior sidewall of the corresponding cap are threaded for engagement with each other.

14. The mounting adapter of claim 1, wherein the second fastener extends from a second shoulder formed on the upper surface of the anchor plate.

15. The mounting adapter of claim 1, wherein the second fastener is attached to a second shoulder formed on the upper surface of the anchor plate.

16. A method for attaching an object to a mounting surface in accordance with the mounting adapter including an anchor plate having an upper surface and a lower surface, and one or more first apertures extending through the upper and lower surfaces, each first aperture including a counterbore configured to receive a corresponding first elongated fasteners, each elongated fastener having a length sufficient to extend through and securely fasten the anchor plate to a support structure below the generally flat surface; and a second fastener extending from the upper surface of the anchor plate in an upwardly direction generally opposing a fastening direction of the first elongated fasteners, said second fastener being configured to secure the object to the mounting adapter over the general flat surface, wherein the anchor plate is configured to transfer load forces from the object directly to a support structure below the generally flat surface via the first elongated fasteners, the method comprising:

- positioning the anchor plate on the mounting surface at a predetermined location;
- inserting the first elongated fasteners through a corresponding one of the first apertures;
- securing each first elongated fastener to a predetermined support structure positioned beneath the anchor plate for attaching the mounting adapter to the mounting surface;
- securing the second fastener to the object, wherein load forces from the object are directly transferred from the mounting adapter to the support structure below the generally flat surface via the first elongated fasteners.

* * * * *